United States Patent
Sukawa et al.

(10) Patent No.: US 9,478,817 B2
(45) Date of Patent: Oct. 25, 2016

(54) FUEL CELL SYSTEM

(71) Applicant: PANASONIC INTELLECTUAL PROPERTY MANAGEMENT CO., LTD., Osaka (JP)

(72) Inventors: Toru Sukawa, Osaka (JP); Noboru Taniguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/647,448

(22) PCT Filed: Nov. 14, 2013

(86) PCT No.: PCT/JP2013/006698
§ 371 (c)(1),
(2) Date: May 26, 2015

(87) PCT Pub. No.: WO2014/083794
PCT Pub. Date: Jun. 5, 2014

(65) Prior Publication Data
US 2015/0311552 A1    Oct. 29, 2015

(30) Foreign Application Priority Data
Nov. 29, 2012    (JP) .................................. 2012-261328

(51) Int. Cl.
*H01M 8/06*    (2016.01)
*H01M 8/04*    (2016.01)
(Continued)

(52) U.S. Cl.
CPC .............. *H01M 8/0675* (2013.01); *C01B 3/38* (2013.01); *H01M 8/04097* (2013.01); *H01M 8/0618* (2013.01); *H01M 8/0662* (2013.01); *C01B 2203/025* (2013.01); *C01B 2203/0233* (2013.01); *C01B 2203/0244* (2013.01); *C01B 2203/066* (2013.01); *C01B 2203/127* (2013.01);
(Continued)

(58) Field of Classification Search
None
See application file for complete search history.

(56) References Cited

U.S. PATENT DOCUMENTS 3,655,448 A    4/1972  Setzer
5,130,115 A    7/1992  Fujisou et al.
(Continued)

FOREIGN PATENT DOCUMENTS

JP    61-080768 A    4/1986
JP    05-326004 A    12/1993
(Continued)

OTHER PUBLICATIONS

Extended European Search Report issued in European Application No. 13858761.3 dated Nov. 9, 2015.
(Continued)

*Primary Examiner* — Gregg Cantelmo
(74) *Attorney, Agent, or Firm* — McDermott Will & Emery LLP (57) ABSTRACT

A fuel cell system includes: a reformer operative to generate a reformed gas by using a raw material gas; a fuel cell operative to generate electric power by using the reformed gas from the reformer and air; a desulfurizer operative to perform hydrodesulfurization of the raw material gas; a recycled gas passage through which a part of the reformed gas is supplied as a recycled gas to a raw material gas passage provided upstream of the desulfurizer; and a heat exchanger operative to cause the recycled gas flowing through the recycled gas passage to perform heat exchange with one of the raw material gas and the air.

9 Claims, 9 Drawing Sheets

(51) Int. Cl.
*C01B 3/38* (2006.01)
*H01M 8/12* (2016.01)

(52) U.S. Cl.
CPC ..... *C01B2203/148* (2013.01); *H01M 8/04022* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 5,302,470 | A | 4/1994 | Okada et al. |
| 7,648,541 | B2 * | 1/2010 | Bolden .................. C01B 3/384 208/209 |
| 2007/0190374 | A1 * | 8/2007 | Harada ................. B01J 8/0453 429/412 |
| 2008/0113246 | A1 * | 5/2008 | Kivisaari .......... H01M 8/04022 429/429 |
| 2014/0038071 | A1 | 2/2014 | Ogawa |

FOREIGN PATENT DOCUMENTS

| | | |
|---|---|---|
| JP | 2000-331700 A | 11/2000 |
| JP | 2002-025596 A | 1/2002 |
| JP | 2002-097001 A | 4/2002 |
| JP | 2003-017109 A | 1/2003 |
| JP | 2003-132926 A | 5/2003 |
| JP | 2006-054171 A | 2/2006 |
| JP | 2006-075850 A | 3/2006 |
| JP | 2006-092764 A | 4/2006 |
| JP | 2006-127774 A | 5/2006 |
| JP | 2007-269528 A | 10/2007 |
| JP | 2008-004467 A | 1/2008 |
| JP | 2008-204707 A | 9/2008 |
| JP | 2009-173479 A | 8/2009 |
| JP | 2011-216308 A | 10/2011 |
| JP | 2012-158489 A | 8/2012 |
| WO | 03/063282 A1 | 7/2003 |
| WO | 2012/128369 A1 | 9/2012 |

OTHER PUBLICATIONS

International Search Report issued in International Application No. PCT/JP2013/006698 with Date of mailing Feb. 4, 2014, with English Translation.

\* cited by examiner

FUEL CELL SYSTEM

RELATED APPLICATIONS

This application is a national phase of International Application No. PCT/JP2013/006698, filed on Nov. 14, 2014, which in turn claims the benefit of Japanese Application No. 2012-261328, filed on Nov. 29, 2012 the disclosures of which Applications are incorporated by reference herein.

TECHNICAL FIELD

The present invention relates to a fuel cell system.

BACKGROUND ART

In a fuel cell system which uses hydrocarbon as a raw material gas, a reforming reaction of the raw material gas is executed. To accelerate the reforming reaction, a reforming catalyst is used. However, since the raw material gas contains, for example, a sulfur compound as an odorant, the reforming catalyst may deteriorate by the sulfur compound. To suppress the deterioration of the reforming catalyst, a desulfurizer which removes the sulfur compound in the raw material gas is utilized.

One example of such a desulfurizer is a hydro-desulfurizer which performs hydrodesulfurization of causing the sulfur compound of the raw material gas to react with hydrogen on a catalyst to convert the sulfur compound into hydrogen sulfide and removing this hydrogen sulfide.

The hydro-desulfurizer is heated to a temperature suitable for a hydrogenation reaction and requires the hydrogen when performing the desulfurization. In many cases, the fuel cell system uses a method of: adding a part of a hydrogen-containing reformed gas generated by the reformer to the raw material gas before the raw material gas flows into the hydro-desulfurizer; and performing the hydrodesulfurization.

Figure 8:
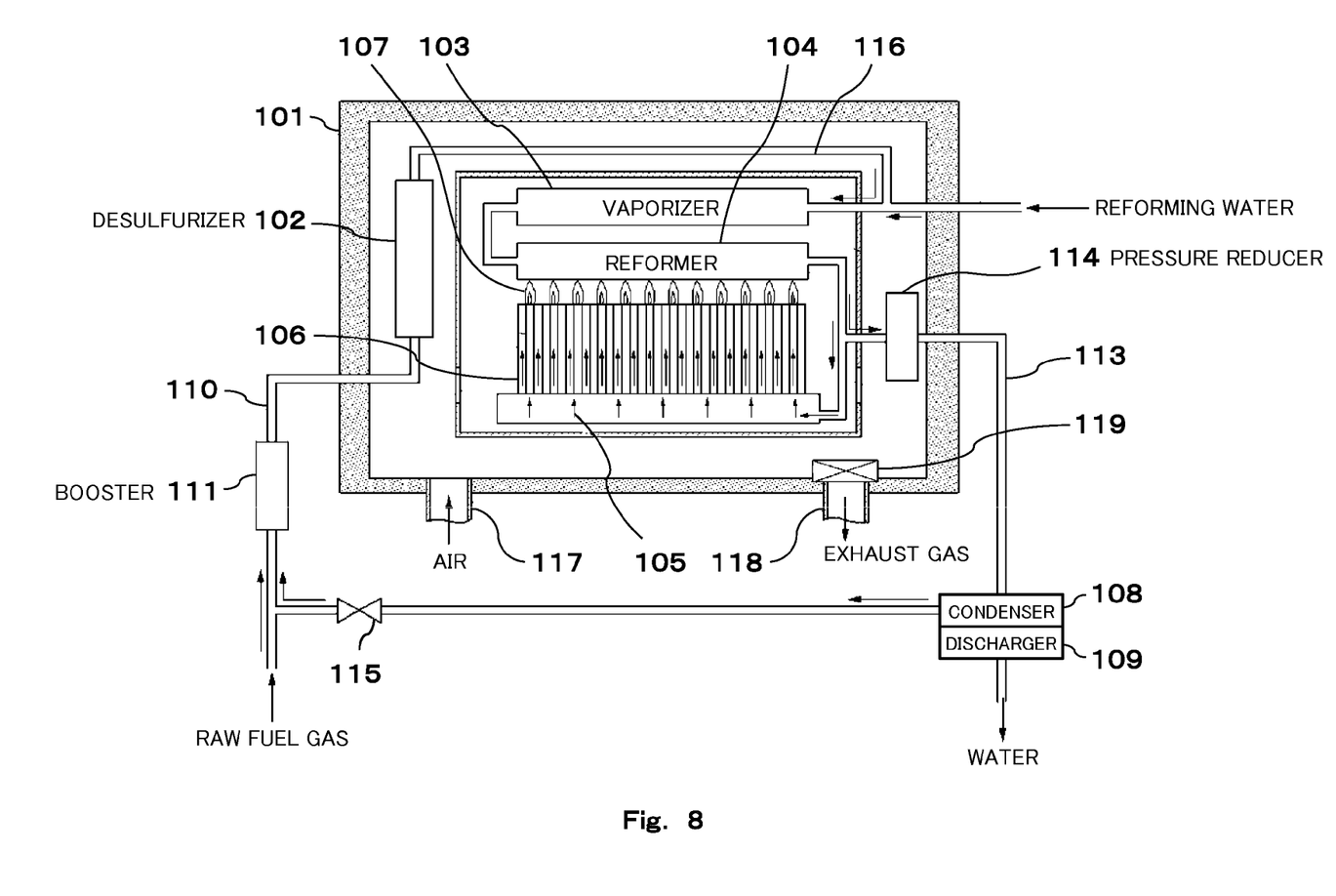
FIG. 8 is a diagram showing one example of a conventional fuel cell system.
Figure 9:
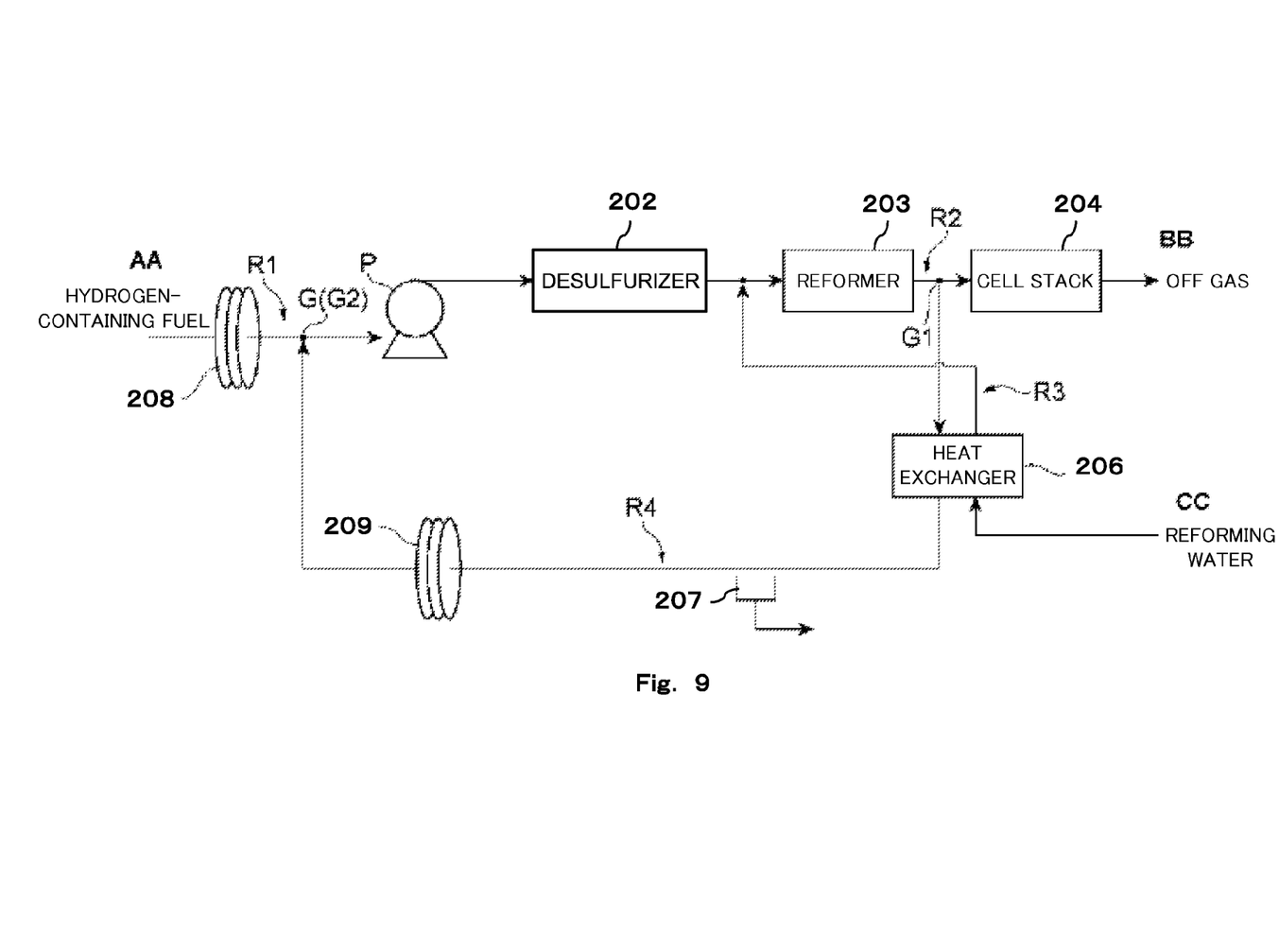
FIG. 9 is a diagram showing one example of another conventional fuel cell system.

Generally, the reformed gas has a high temperature of not lower than 500° C. Therefore, if such a reformed gas is added to the raw material gas, auxiliary devices and the like constituting the fuel cell system may be damaged. Therefore, according to PTL 1, as shown in FIG. 8, a recycled gas supply passage 113 is provided, through which a part of the reformed gas from a reformer 104 flows into a raw fuel supply passage 110. With this, the recycled gas is cooled down by heat radiation to the atmosphere, and the hydrogen required by the hydro-desulfurizer is supplied to the hydro-desulfurizer. Further, according to PTL 2, as shown in FIG. 9, a heat exchanger which performs heat exchange between the recycled gas and the reforming water is disposed on a circulation passage R4 serving as the recycled gas supply passage. With this, the recycled gas is cooled down, and the heat of the recycled gas is recovered by the reforming water. Thus, the efficiency of the fuel cell system is increased.

CITATION LIST

Patent Literature

PTL 1: Japanese Laid-Open Patent Application Publication No. 2011-216308
PTL 2: International Publication No. 2012/128369
PTL 3: Japanese Patent No. 2993507

SUMMARY OF INVENTION

Technical Problem

However, the improvement in efficiency of the fuel cell system by the heat recovery from the recycled gas and the stable driving operation of the fuel cell system are not adequately discussed in the above conventional examples.

The present invention was made under these circumstances, and an object of the present invention is to provide a fuel cell system which can realize a higher efficiency than before by heat recovery from a recycled gas and perform a more stable driving operation than before.

Solution to Problem

To solve the above problems, a fuel cell system according to one aspect of the present invention includes: a reformer operative to generate a reformed gas by using a raw material gas; a fuel cell operative to generate electric power by using the reformed gas from the reformer and air; a desulfurizer operative to perform hydrodesulfurization of the raw material gas; a recycled gas passage through which a part of the reformed gas is supplied as a recycled gas to a raw material gas passage provided upstream of the desulfurizer; and a heat exchanger operative to cause the recycled gas flowing through the recycled gas passage to perform heat exchange with one of the raw material gas and the air.

Advantageous Effects of Invention

The fuel cell system according to the aspect of the present invention is configured as explained above and can realize the higher efficiency than before by the heat recovery from the recycled gas and perform the more stable driving operation than before.

DESCRIPTION OF EMBODIMENTS

Embodiment 1

The present inventors have diligently studied problems of conventional examples regarding the improvement in efficiency of the fuel cell system by the heat recovery from the recycled gas and the stable driving operation of the fuel cell system. As a result, the present inventors have obtained the following findings.

The fuel cell system of PTL 1 is configured such that when cooling down the recycled gas flowing through the recycled gas supply passage 113, the heat of the recycled gas is radiated to the outside of the system. Therefore, the fuel cell system of PTL 1 has a problem that the efficiency of the fuel cell system decreases by heat radiation loss.

Further, according to the fuel cell system of PTL 2, since the recycled gas that is a part of the reformed gas is high in temperature, the reforming water may boil, so that the supply amount of reforming water may fluctuate. Therefore, the driving operation of the fuel cell system may become unstable.

A fuel cell system according to Embodiment 1 includes: a reformer operative to generate a reformed gas by using a raw material gas; a fuel cell operative to generate electric power by using the reformed gas from the reformer and air; a desulfurizer operative to perform hydrodesulfurization of the raw material gas; a recycled gas passage through which a part of the reformed gas is supplied as a recycled gas to a raw material gas passage provided upstream of the desulfurizer; and a heat exchanger operative to cause the recycled gas flowing through the recycled gas passage to perform heat exchange with one of the raw material gas and the air.

According to the above configuration, the fuel cell system can realize the higher efficiency than before by the heat recovery from the recycled gas and perform the more stable driving operation than before.

Hereinafter, Examples 1 and 2 and Modification Examples 1 to 3 of Embodiment 1, and Embodiments 2 and 3 will be explained in reference to the drawings.

In the following explanations and drawings, the same reference signs are used for the same or corresponding components, and a repetition of the same explanation is avoided.

Example 1

The fuel cell system according to Example 1 of Embodiment 1 is configured such that in the fuel cell system of Embodiment 1, the heat exchanger includes a first heat exchanger operative to cause the recycled gas flowing through the recycled gas passage to perform the heat exchange with the raw material gas, and the raw material gas flows through the first heat exchanger and the desulfurizer in this order.

According to the above configuration, by the first heat exchanger, the recycled gas flowing through the recycled gas passage can be cooled down, and the heat can be recovered from the recycled gas by using the raw material gas. Therefore, the heat radiation loss to the outside of the fuel cell system can be reduced, and the efficiency of the fuel cell system can be improved. Further, the raw material gas flowing toward the desulfurizer can be heated. Therefore, a time required until the temperature of the desulfurizer becomes a proper temperature (for example, not lower than 150° C.) can be shortened. Further, since the recycled gas performs the heat exchange with the raw material gas, the fuel cell system can perform the stable driving operation.

Except for the above, the fuel cell system according to the present example may be the same in configuration as the fuel cell system according to Embodiment 1.

Device Configuration

Figure 1:
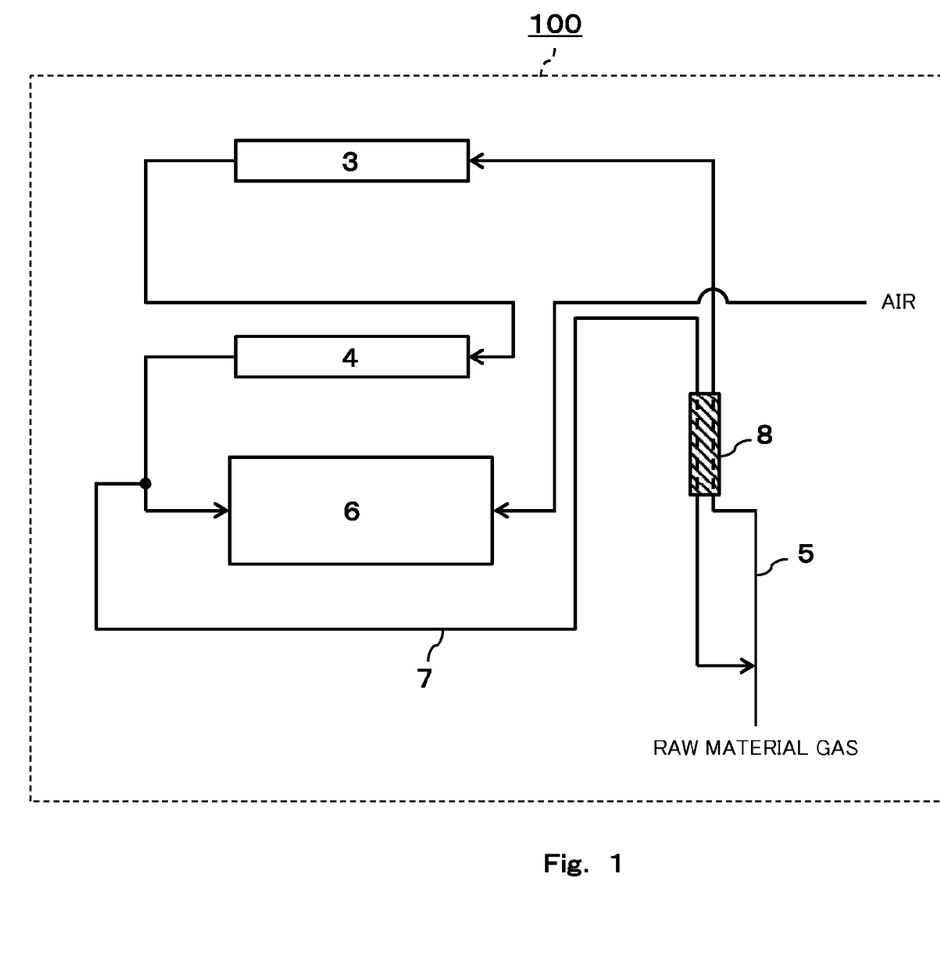
FIG. 1 is a diagram showing one example of a fuel cell system according to Example 1 of Embodiment 1.

FIG. 1 is a diagram showing one example of the fuel cell system according to Example 1 of Embodiment 1. FIG. 1 schematically shows the configuration of a fuel cell system 100 according to Embodiment 1 when viewed laterally.

As shown in FIG. 1, the fuel cell system 100 according to the present example includes a reformer 4, a fuel cell 6, a desulfurizer 3, a raw material gas passage 5, a recycled gas passage 7, and a first heat exchanger 8.

The reformer 4 generates a reformed gas by using a raw material gas. Specifically, the reformer 4 causes a reforming reaction of the raw material gas to generate a hydrogen-containing reformed gas. The reforming reaction may be any type, and examples thereof include a steam-reforming reaction, an autothermal reaction, and a partial oxidation reaction. To realize a highly-efficient operation of the fuel cell system 100, it is preferable that the reformer 4 be configured to perform not only the partial oxidation reaction but also the steam-reforming reaction. In a case where the reforming reaction is the steam-reforming reaction, for example, an evaporator which generates steam and a water supplier which supplies water to the evaporator may be provided. The amount of hydrogen generated from a certain amount of raw material gas by the steam-reforming reaction is larger than that by the partial oxidation reforming reaction. Therefore, the steam-reforming reaction excels in efficiency. However, since the steam-reforming reaction is an endothermic reaction, heat needs to be supplied. As this heat, for example, radiation heat generated when the fuel cell 6 operates may be utilized. The raw material gas is a gas containing an organic compound constituted by at least carbon and hydrogen, and examples thereof include a city gas containing methane as a major component, a natural gas, and a LPG.

Examples of a reforming catalyst of the reformer 4 include: a catalyst supporting Ni, which is prepared by impregnating surfaces of spheres of $Al_2O_3$ (alumina) with the Ni; and a catalyst prepared by applying ruthenium to the surfaces of the spheres of the $Al_2O_3$.

The reformed gas generated by the reformer 4 is supplied through a reformed gas supply passage to the fuel cell 6.

The fuel cell 6 generates the electric power by using the reformed gas from the reformer 4 and the air. The fuel cell 6 may be any type, and examples thereof include a polymer electrolyte fuel cell, a molten carbonate fuel cell, a solid-oxide fuel cell, and a phosphoric-acid fuel cell. In a case where the fuel cell is the solid-oxide fuel cell or the molten carbonate fuel cell, the electric power generation is performed at high temperatures (for example, not lower than 600° C.). In this case, in consideration of the durability of the fuel cell, not only internal reforming of reforming the raw material gas in the fuel cell but also a configuration in which a reformer reforming the raw material gas before the raw material gas flows into the fuel cell is provided in a casing (hot module) together with the fuel cell is used in many cases. The following will explain a configuration in which the solid-oxide fuel cell is used as the fuel cell 6, and the reformer 4 is provided in the casing.

As shown in FIG. 1, the solid-oxide fuel cell 6 generates the electric power by an electric power generating reaction using the reformed gas from the reformer 4 and the air (electric power generation air) from an air supplier (not shown). In the solid-oxide fuel cell 6, a plurality of fuel cell unit cells each of which performs the electric power generating reaction between a fuel electrode to which the reformed gas is supplied and an air electrode to which the air is supplied may be connected in series to form a cell stack, or such cell stacks may be further connected in parallel. As the fuel cell unit cell, for example, a fuel cell unit cell constituted by zirconia (YSZ) doped with yttria, zirconia doped with ytterbium or scandium, or lanthanum gallate based solid electrolyte can be used. For example, in a case where the fuel cell unit cell is the YSZ, the electric power generating reaction is performed within a temperature range of about 600-900° C. depending on the thickness of the fuel cell unit cell.

The desulfurizer 3 performs hydrodesulfurization of the raw material gas. Specifically, the desulfurizer 3 removes the sulfur compound in the raw material gas to be supplied to the reformer 4. For example, a desulfurizing agent containing copper and zinc can be used as a hydrodesulfurization agent (for example, see PTL 3). However, the hydrodesulfurization agent is not limited to this and may be a catalyst prepared by combining a Ni—Mo or Co—Mo based catalyst and a zinc oxide based catalyst. In a case where the hydrodesulfurization agent contains copper and zinc, a proper temperature operating range of the desulfurizer 3 is about 150-350° C. For example, in a case where the hydrodesulfurization of the city gas as the raw material gas is performed within this operating range, the amount of sulfur compound contained in the raw material gas having flowed through the desulfurizer 3 is not more than 1 vol ppb (parts per billion) and normally not more than 0.1 vol ppb.

The recycled gas passage 7 is a passage through which a part of the reformed gas is supplied as the recycled gas to the raw material gas passage 5 provided upstream of the desulfurizer 3. Specifically, the recycled gas passage 7 branches from the reformed gas supply passage extending between the reformer 4 and the fuel cell 6 and joins the raw material gas passage 5 provided upstream of the desulfurizer 3. With this, the hydrogen can be added to the raw material gas flowing through the raw material gas passage 5 toward the desulfurizer 3. As a result, the desulfurizer 3 can perform the hydrodesulfurization by utilizing the hydrogen. The raw material gas passage 5 is a passage through which the raw material gas to be supplied to the reformer 4 flows.

The first heat exchanger 8 causes the recycled gas flowing through the recycled gas passage 7 to perform the heat exchange with the raw material gas. The raw material gas flows through the first heat exchanger 8 and the desulfurizer 3 in this order.

By the first heat exchanger 8, the recycled gas flowing through the recycled gas passage 7 can be cooled down, and the heat can be recovered from the recycled gas by using the raw material gas flowing through the raw material gas passage 5. Therefore, the heat radiation loss to the outside of the fuel cell system 100 can be reduced, and this can improve the efficiency of the fuel cell system 100. Further, in a case where the desulfurizer 3 is low in temperature, the desulfurizer 3 can be heated by the raw material gas. Therefore, the time required until the temperature of the desulfurizer 3 becomes the proper temperature (for example, not lower than 150° C.) can be shortened. Further, since the recycled gas performs the heat exchange with the raw material gas, the fuel cell system 100 can perform the stable driving operation.

The desulfurizer 3, the reformer 4, the fuel cell 6, and the like may be arranged inside the casing (not shown), and a heat insulating portion (not shown) made of a heat insulating material may be arranged on an inner wall of the casing. With this, the heat radiation from the inside of the casing to the outside of the casing can be appropriately suppressed. In this case, the first heat exchanger 8 may be provided in the heat insulating portion. With this, since the first heat exchanger 8 is covered with the heat insulating portion, the heat radiation of the first heat exchanger 8 can be suppressed. In addition, the fuel cell system 100 can be reduced in size.

Example 2

The fuel cell system according to Example 2 of Embodiment 1 is configured such that in the fuel cell system according to Embodiment 1, the heat exchanger includes a second heat exchanger operative to cause the recycled gas flowing through the recycled gas passage to perform the heat exchange with the air, and the air flows through the second heat exchanger and the fuel cell in this order.

According to the above configuration, by the second heat exchanger, the recycled gas flowing through the recycled gas passage can be cooled down, and the heat can be recovered from the recycled gas by using the air. Therefore, the heat radiation loss to the outside of the fuel cell system can be reduced, and this can improve the efficiency of the fuel cell system. Since the recycled gas performs the heat exchange with the air, the fuel cell system can perform the stable driving operation.

Except for the above, the fuel cell system according to the present example may be the same in configuration as the fuel cell system according to Embodiment 1.

Device Configuration

Figure 2:
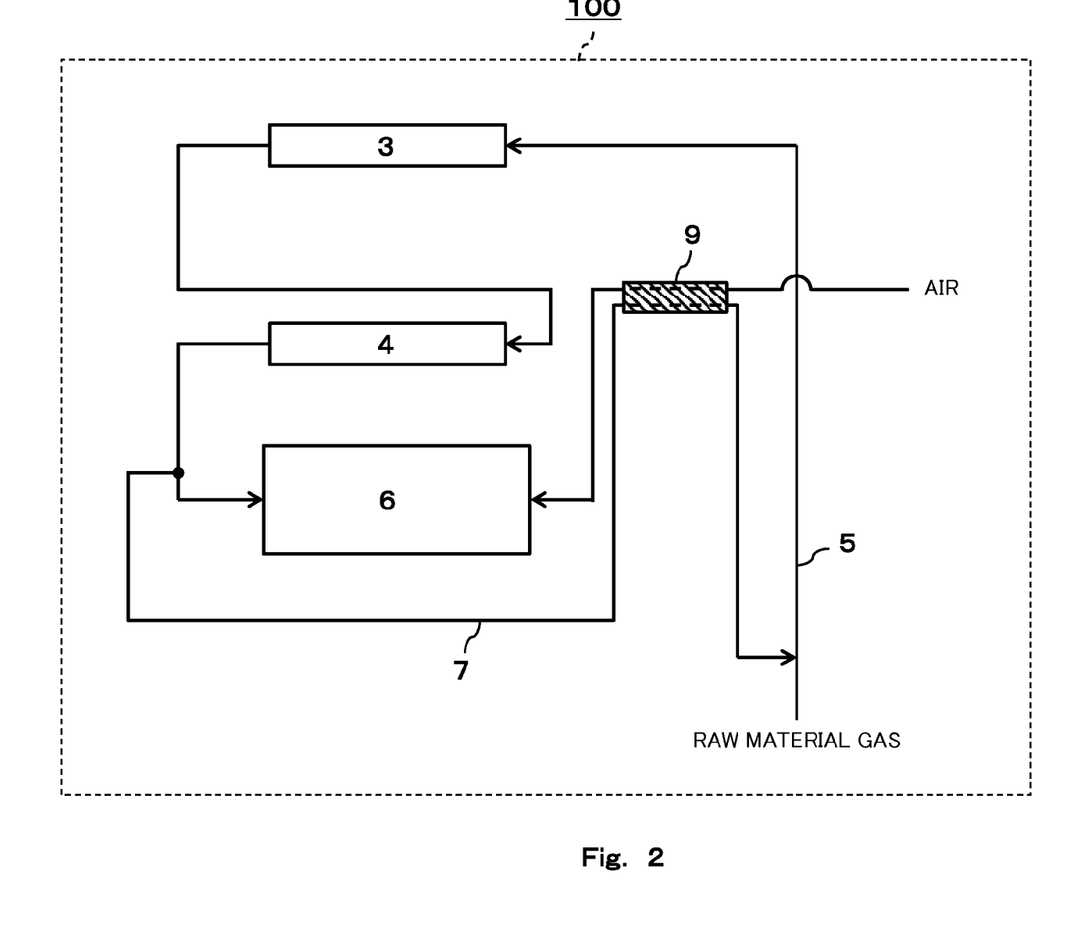
FIG. 2 is a diagram showing one example of the fuel cell system according to Example 2 of Embodiment 1.

FIG. 2 is a diagram showing one example of the fuel cell system according to Example 2 of Embodiment 1.

As shown in FIG. 2, the fuel cell system 100 according to the present example includes the reformer 4, the fuel cell 6, the desulfurizer 3, the raw material gas passage 5, the recycled gas passage 7, and a second heat exchanger 9.

Since the reformer 4, the fuel cell 6, the desulfurizer 3, the raw material gas passage 5, and the recycled gas passage 7 are the same as those in Example 1 of Embodiment 1, explanations thereof are omitted.

The second heat exchanger 9 causes the recycled gas flowing through the recycled gas passage to perform the heat exchange with the air. The air flows through the second heat exchanger 9 and the fuel cell 6 in this order.

By the second heat exchanger 9, the recycled gas flowing through the recycled gas passage 7 can be cooled down, and the heat can be recovered from the recycled gas by using the air flowing toward the fuel cell 6. Therefore, the heat radiation loss to the outside of the fuel cell system 100 can be reduced, and this can improve the efficiency of the fuel cell system 100. Since the recycled gas performs the heat exchange with the air, the fuel cell system 100 can perform the stable driving operation.

As with the first heat exchanger 8, the second heat exchanger 9 may be provided in the heat insulating portion made of the heat insulating material. With this, since the second heat exchanger 9 is covered with the heat insulating portion, the heat radiation of the second heat exchanger 9 can be suppressed. In addition, the fuel cell system 100 can be reduced in size.

Modification Example 1

The fuel cell system according to Modification Example 1 of Embodiment 1 is configured such that the fuel cell system according to Example 1 of Embodiment 1 includes a combustor operative to combust the reformed gas and the air which are unused by electric power generation, an exhaust gas passage through which an exhaust gas from the combustor flows, and a third heat exchanger operative to cause the exhaust gas flowing through the exhaust gas passage to perform the heat exchange with the raw material gas, and the raw material gas flows through the first heat exchanger, the third heat exchanger, and the desulfurizer in this order.

According to the above configuration, the raw material gas flowing toward the desulfurizer can be heated by the heat exchange with the recycled gas in the first heat exchanger and further heated by the heat exchange with the exhaust gas in the third heat exchanger. Therefore, the temperature of the raw material gas flowing toward the desulfurizer becomes further higher than that in Example 1 of Embodiment 1. On this account, the time required until the temperature of the desulfurizer becomes the proper temperature (for example, not lower than 150° C.) can be further shortened.

Except for the above, the fuel cell system according to the present modification example may be the same in configuration as the fuel cell system according to Example 1 of Embodiment 1.

Device Configuration

Figure 3:
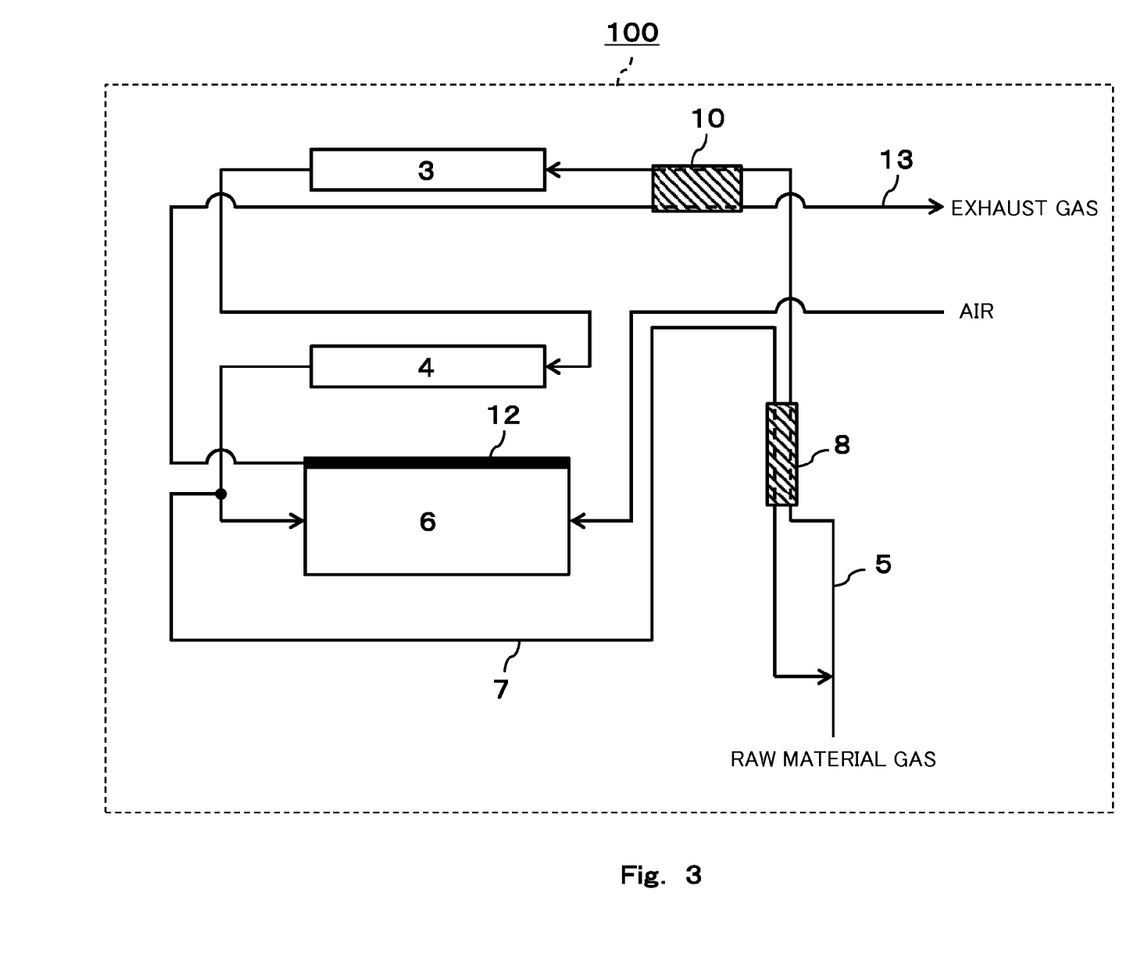
FIG. 3 is a diagram showing one example of the fuel cell system according to Modification Example 1 of Embodiment 1.

FIG. 3 is a diagram showing one example of the fuel cell system according to Modification Example 1 of Embodiment 1.

As shown in FIG. 3, the fuel cell system 100 according to the present modification example includes the reformer 4, the fuel cell 6, the desulfurizer 3, the raw material gas passage 5, the recycled gas passage 7, the first heat exchanger 8, a combustor 12, a third heat exchanger 10, and an exhaust gas passage 13.

Since the reformer 4, the fuel cell 6, the desulfurizer 3, the raw material gas passage 5, the recycled gas passage 7, and the first heat exchanger 8 are the same as those in Example 1 of Embodiment 1, explanations thereof are omitted.

The combustor 12 combusts the reformed gas and the air which are unused by the electric power generation. The exhaust gas passage 13 is a passage through which the exhaust gas from the combustor 12 flows. With this, the exhaust gas flows through the exhaust gas passage 13 to be discharged to the outside of the fuel cell system 100.

The third heat exchanger 10 causes the exhaust gas flowing through the exhaust gas passage 13 to perform the heat exchange with the raw material gas. The raw material gas flows through the first heat exchanger 8, the third heat exchanger 10, and the desulfurizer 3 in this order.

With this, the raw material gas flowing toward the desulfurizer 3 can be heated by the heat exchange with the recycled gas in the first heat exchanger 8 and further heated by the heat exchange with the exhaust gas in the third heat exchanger 10. Therefore, the temperature of the raw material gas flowing toward the desulfurizer 3 becomes further higher than that in Example 1 of Embodiment 1. On this account, the time required until the temperature of the desulfurizer 3 becomes the proper temperature (for example, not lower than 150° C.) can be further shortened.

Modification Example 2

The fuel cell system according to Modification Example 2 of Embodiment 1 is configured such that the fuel cell system according to Example 2 of Embodiment 1 includes a combustor operative to combust the reformed gas and the air which are unused by electric power generation, an exhaust gas passage through which an exhaust gas from the combustor flows, and a fourth heat exchanger operative to cause the exhaust gas flowing through the exhaust gas passage to perform the heat exchange with the air, and the air flows through the second heat exchanger, the fourth heat exchanger, and the fuel cell in this order.

According to the above configuration, the air flowing toward the fuel cell can be heated by the heat exchange with the recycled gas in the second heat exchanger and further heated by the heat exchange with the exhaust gas in the fourth heat exchanger. Therefore, the heat radiation loss to the outside of the fuel cell system can be further made smaller than that in Example 2 of Embodiment 1, and this can improve the efficiency of the fuel cell system.

Except for the above, the fuel cell system according to the present modification example may be the same in configuration as the fuel cell system according to Example 2 of Embodiment 1.

Device Configuration

Figure 4:
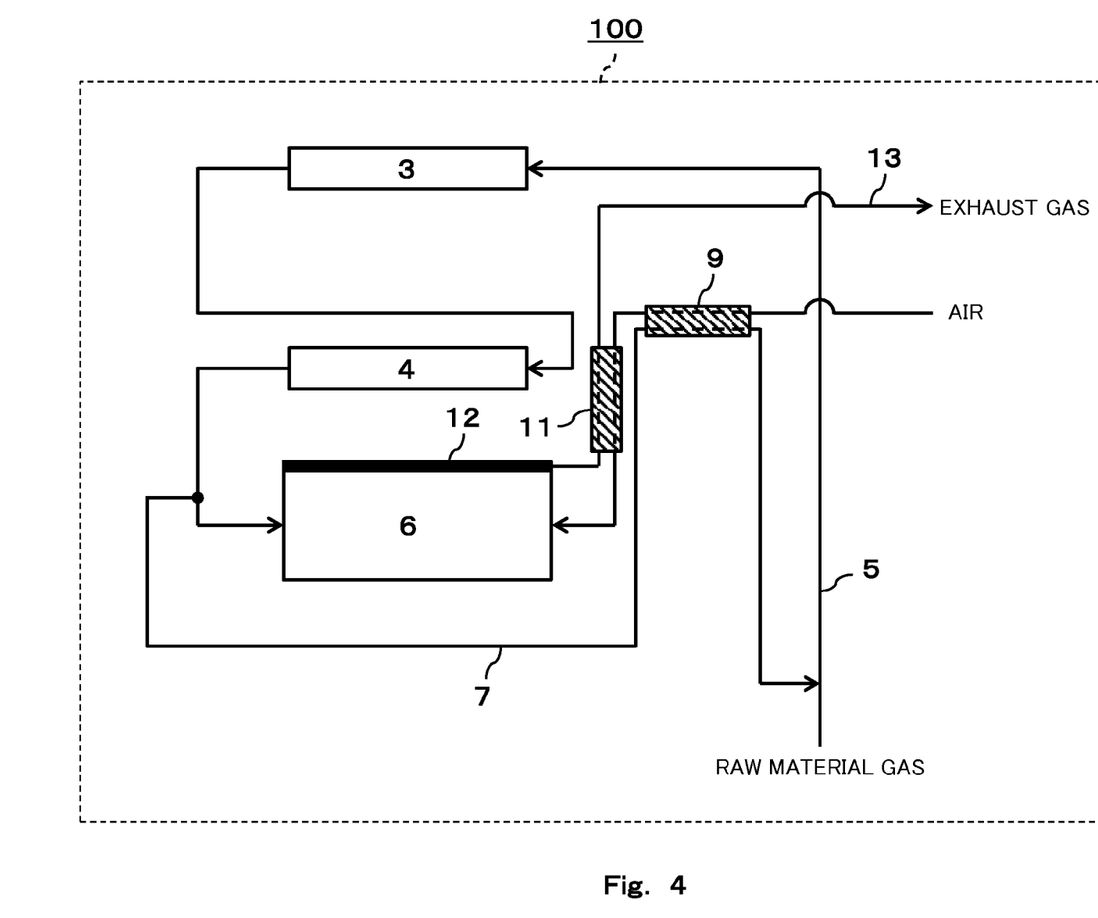
FIG. 4 is a diagram showing one example of the fuel cell system according to Modification Example 2 of Embodiment 1.

FIG. 4 is a diagram showing one example of the fuel cell system according to Modification Example 2 of Embodiment 1.

As shown in FIG. 4, the fuel cell system 100 according to the present modification example includes the reformer 4, the fuel cell 6, the desulfurizer 3, the raw material gas passage 5, the recycled gas passage 7, the second heat exchanger 9, the combustor 12, a fourth heat exchanger 11, and the exhaust gas passage 13.

Since the reformer 4, the fuel cell 6, the desulfurizer 3, the raw material gas passage 5, the recycled gas passage 7, and the second heat exchanger 9 are the same as those in Example 2 of Embodiment 1, explanations thereof are omitted. Since the combustor 12 and the exhaust gas passage 13 are the same as those in Modification Example 1 of Embodiment 1, explanations thereof are omitted.

The fourth heat exchanger 11 causes the exhaust gas flowing through the exhaust gas passage 13 to perform the heat exchange with the air. The air flows through the second heat exchanger 9, the fourth heat exchanger 11, and the fuel cell 6 in this order.

With this, the air flowing toward the fuel cell 6 can be heated by the heat exchange with the recycled gas in the second heat exchanger 9 and further heated by the heat exchange with the exhaust gas in the fourth heat exchanger. Therefore, the heat radiation loss to the outside of the fuel cell system 100 can be made smaller than that in Example 2 of Embodiment 1, and this can improve the efficiency of the fuel cell system 100.

Modification Example 3

The fuel cell system according to Modification Example 3 of Embodiment 1 is configured such that the fuel cell system according to Modification Example 1 of Embodiment 1 includes a heater operative to heat the desulfurizer by the exhaust gas flowing through the exhaust gas passage, and the exhaust gas flows through the heater and the third heat exchanger in this order.

According to the above configuration, the raw material gas heated by the heat exchange with the recycled gas in the first heat exchanger performs the heat exchange in the third heat exchanger with the exhaust gas having flowed through the heater. Therefore, the raw material gas flowing toward the desulfurizer can be further heated. Therefore, the temperature of the raw material gas flowing toward the desulfurizer becomes further higher than that in Example 1 of Embodiment 1. On this account, the time required until the temperature of the desulfurizer becomes the proper temperature (for example, not lower than 150° C.) can be shortened. Since the exhaust gas having flowed through the heater which heats the desulfurizer and the raw material gas perform the heat exchange with each other, the temperature difference between the raw material gas and the heater can be reduced. With this, the temperature distribution of the desulfurizer can be smoothed.

Except for the above, the fuel cell system according to the present modification example may be the same in configuration as the fuel cell system according to Modification Example 1 of Embodiment 1.

Device Configuration

Figure 5:
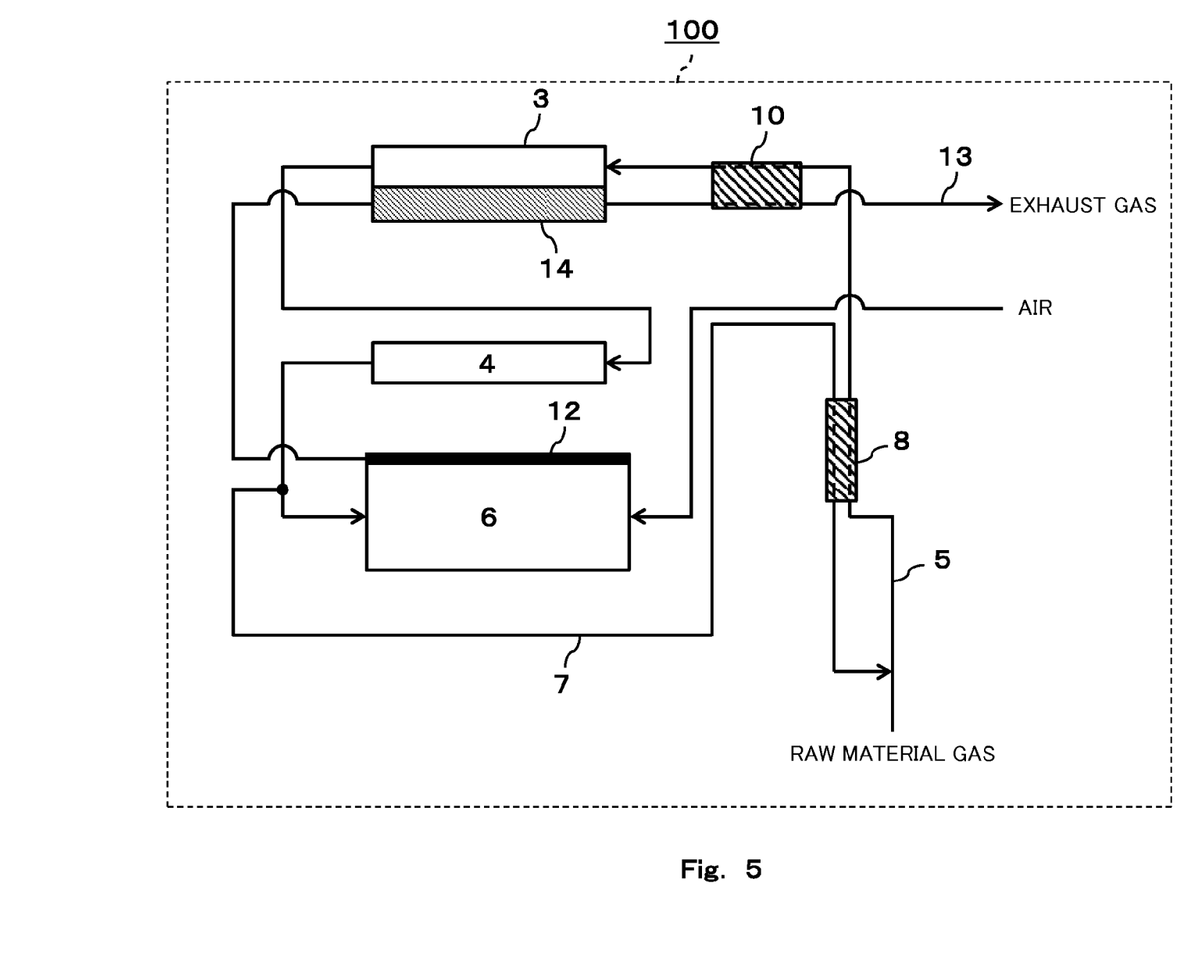
FIG. 5 is a diagram showing one example of the fuel cell system according to Modification Example 3 of Embodiment 1.

FIG. 5 is a diagram showing one example of the fuel cell system according to Modification Example 3 of Embodiment 1.

As shown in FIG. 5, the fuel cell system 100 according to the present modification example includes the reformer 4, the fuel cell 6, the desulfurizer 3, the raw material gas passage 5, the recycled gas passage 7, the first heat exchanger 8, the combustor 12, the third heat exchanger 10, the exhaust gas passage 13, and a heater 14.

Since the reformer 4, the fuel cell 6, the desulfurizer 3, the raw material gas passage 5, the recycled gas passage 7, the first heat exchanger 8, the combustor 12, the third heat exchanger 10, and the exhaust gas passage 13 are the same as those in Modification Example 1 of Embodiment 1, explanations thereof are omitted.

The heater 14 heats the desulfurizer 3 by the exhaust gas flowing through the exhaust gas passage. The exhaust gas flows through the heater 14 and the third heat exchanger 10 in this order. The heater 14 may have any configuration as long as it can heat the desulfurizer 3 to the proper temperature (for example, not lower than 150° C.) by utilizing the heat of the exhaust gas. One example of the heater 14 is a heat exchanger.

Thus, the raw material gas heated by the heat exchange with the recycled gas in the first heat exchanger 8 performs the heat exchange in the third heat exchanger 10 with the exhaust gas having flowed through the heater 14. Therefore, the raw material gas flowing toward the desulfurizer 3 can be further heated. On this account, the temperature of the raw material gas flowing toward the desulfurizer 3 becomes further higher than that in Example 1 of Embodiment 1. Thus, the time required until the temperature of the desulfurizer 3 becomes the proper temperature (for example, not lower than 150° C.) can be shortened. Since the exhaust gas having flowed through the heater 14 which heats the desulfurizer 3 and the raw material gas perform the heat exchange with each other, the temperature difference between the raw material gas and the heater 14 can be reduced. Therefore, the temperature distribution of the desulfurizer 3 can be smoothed, so that it is possible to suppress a problem of being unable to achieve a desired desulfurization performance since the desulfurizer 3 is partially too low in temperature and a problem of causing carbon deposition from the desulfurizing agent since the desulfurizer 3 is partially too high in temperature.

Embodiment 2

The fuel cell system according to Embodiment 2 is configured such that the fuel cell system according to any one of Embodiment 1, Examples 1 and 2 of Embodiment 1, and Modification Examples 1 to 3 of Embodiment 1 includes a booster operative to boost pressure of the raw material gas to supply the raw material gas to the desulfurizer, and the recycled gas is supplied to the raw material gas passage provided upstream of the booster.

According to the above configuration, the recycled gas can easily flow from the high pressure side reformer to the low pressure side raw material gas passage. By boosting the pressure of the raw material gas to which the recycled gas is added, the raw material gas can easily flow to respective portions of the fuel cell system. Further, the recycled gas flowing through the recycle passage can be cooled down by the heat exchange with one of the raw material gas and the air. Therefore, the high temperature deterioration of auxiliary devices, pipes, and the like by the heat of the recycled gas flowing through the recycle passage can be made smaller than before.

Except for the above, the fuel cell system according to the present embodiment may be the same in configuration as the fuel cell system according to any one of Embodiment 1, Examples 1 and 2 of Embodiment 1, and Modification Examples 1 to 3 of Embodiment 1.

Device Configuration

Figure 6:
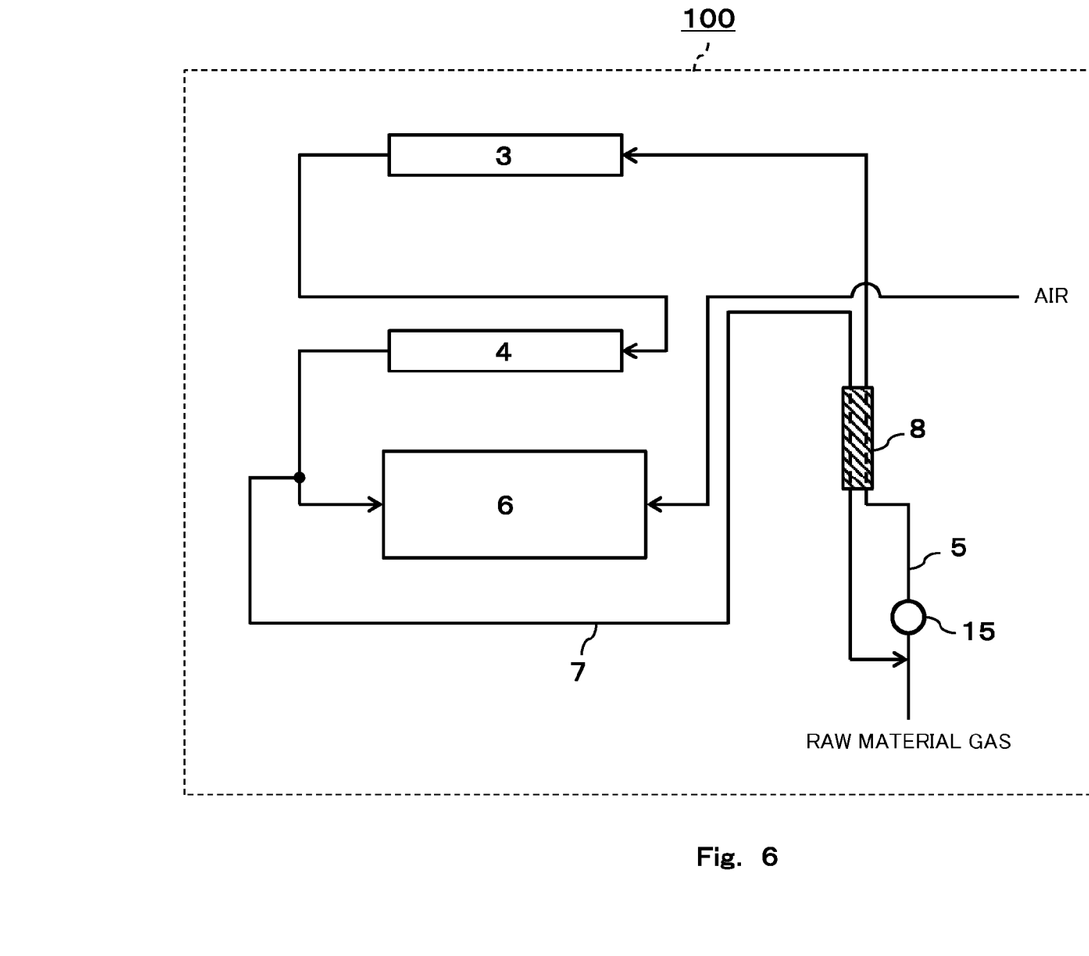
FIG. 6 is a diagram showing one example of the fuel cell system according to Embodiment 2.

FIG. 6 is a diagram showing one example of the fuel cell system according to Embodiment 2.

As shown in FIG. 6, the fuel cell system 100 according to the present embodiment includes the reformer 4, the fuel cell 6, the desulfurizer 3, the raw material gas passage 5, the recycled gas passage 7, the first heat exchanger 8, and a booster 15.

Since the reformer 4, the fuel cell 6, the desulfurizer 3, the raw material gas passage 5, the recycled gas passage 7, and the first heat exchanger 8 are the same as those in Example 1 of Embodiment 1, explanations thereof are omitted.

The booster 15 boosts the pressure of the raw material gas to supply the raw material gas to the desulfurizer 3. The recycled gas is supplied to the raw material gas passage 5 provided upstream of the booster 15. To be specific, to supply a predetermined amount of raw material gas, the pressure of the raw material gas needs to be boosted to pressure set in consideration of passage resistance in the devices provided downstream of the booster 15. The booster 15 may have any configuration as long as it can boost the pressure of the raw material gas. A fixed displacement pump such as a diaphragm pump can be used as the booster 15. The raw material gas is supplied from a raw material gas supply source. The raw material gas supply source has predetermined supply pressure, and examples thereof include a raw material gas bomb and a raw material gas infrastructure.

Thus, the recycled gas of the recycled gas passage 7 can be supplied to the raw material gas passage 5 provided upstream of the booster 15, that is, to the raw material gas passage 5 through which the raw material gas before being subjected to the boosting flows. Therefore, the pressure difference between the high pressure side reformer 4 and the low pressure side raw material gas passage 5 can be adequately secured. On this account, the recycled gas can be easily supplied to the raw material gas passage 5. Since the booster 15 boosts the pressure of the raw material gas to which the recycled gas is added, the raw material gas can easily flow to respective portions of the fuel cell system 100.

Further, the recycled gas flowing through the recycle passage can be cooled down by the heat exchange with the raw material gas. Therefore, the high temperature deterioration of the booster 15 (one example of the auxiliary device) and the pipes (for example, a material of a joint of the pipe), and the like by the heat of the recycled gas can be suppressed.

FIG. 6 showing the present embodiment shows a configuration in which the fuel cell system 100 according to Example 1 of Embodiment 1 includes the booster 15. However, the present embodiment is not limited to this. The fuel cell system 100 according to any one of Example 2 of Embodiment 1 and Modification Examples 1 to 3 of Embodiment 1 may include a booster similar to the booster 15.

Embodiment 3

The fuel cell system according to Embodiment 3 is configured such that the fuel cell system according to any one of Embodiment 1, Examples 1 and 2 of Embodiment 1, Modification Examples 1 to 3 of Embodiment 1, and Embodiment 2 includes a condenser operative to remove moisture in the recycled gas flowing through the recycled gas passage, and the recycled gas first flows through the first heat exchanger or the second heat exchanger and then flows through the condenser.

In a case where a part of the reformed gas from the reformer is used as the recycled gas, the recycled gas typically contains steam. Therefore, when the recycled gas is cooled down, condensed water is generated from the steam of the recycled gas. For example, since the recycled gas is cooled down by the first heat exchanger or the second heat exchanger, there is a possibility that the increase in passage resistance of the recycled gas passage by the condensed water, the clogging of the recycled gas passage by the condensed water, or the like occurs. There is another possibility that the auxiliary devices and the like are damaged by the condensed water.

According to the above configuration, since the moisture of the recycled gas is removed by the condenser, these possibilities can be reduced.

Except for the above, the fuel cell system according to the present embodiment may be the same in configuration as the fuel cell system according to any one of Embodiment 1, Examples 1 and 2 of Embodiment 1, Modification Examples 1 to 3 of Embodiment 1, and Embodiment 2.

Device Configuration

Figure 7:
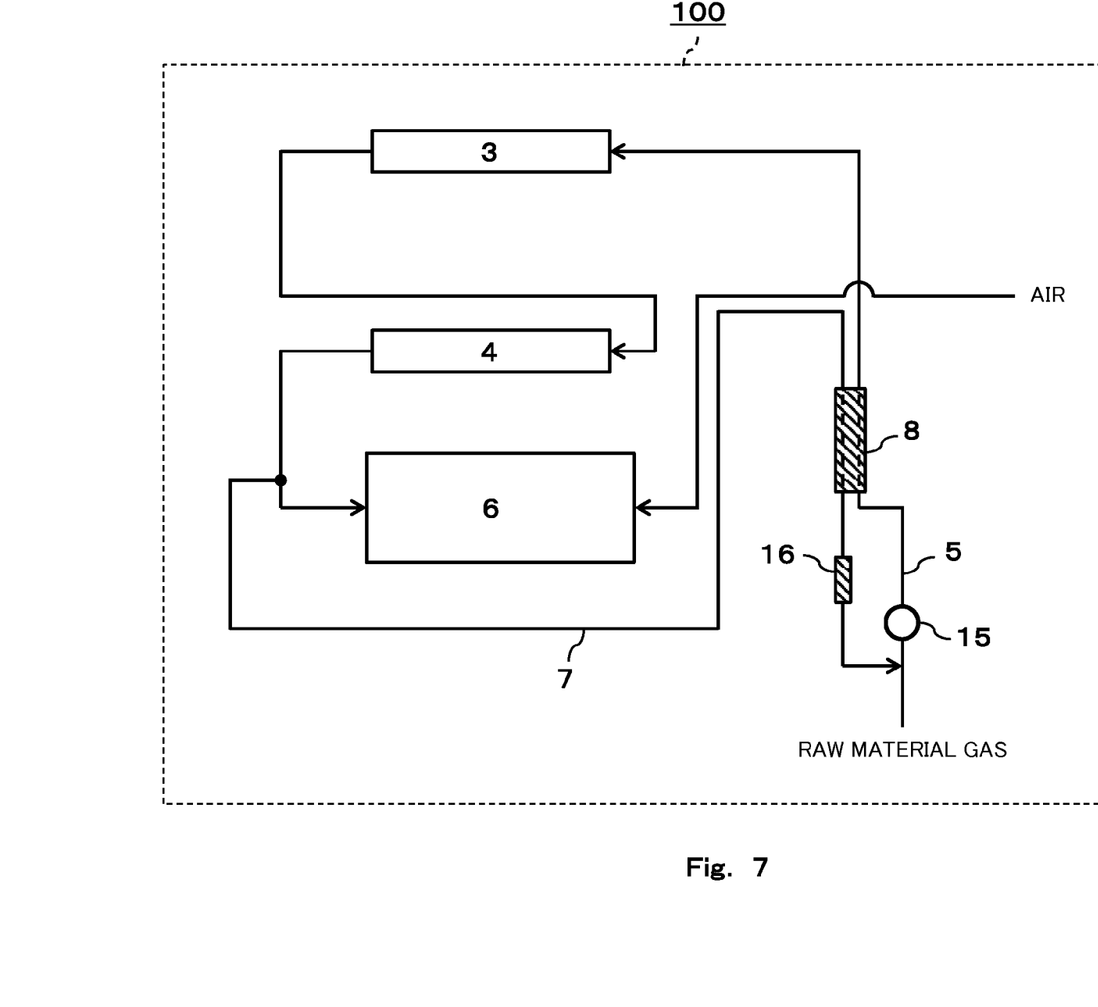
FIG. 7 is a diagram showing one example of the fuel cell system according to Embodiment 3.

FIG. 7 is a diagram showing one example of the fuel cell system according to Embodiment 3.

As shown in FIG. 7, the fuel cell system 100 according to the present embodiment includes the reformer 4, the fuel cell 6, the desulfurizer 3, the raw material gas passage 5, the recycled gas passage 7, the first heat exchanger 8, the booster 15, and a condenser 16.

Since the reformer 4, the fuel cell 6, the desulfurizer 3, the raw material gas passage 5, the recycled gas passage 7, the first heat exchanger 8, and the booster 15 are the same as those in Embodiment 2, explanations thereof are omitted.

The condenser 16 removes the moisture (liquid water and steam) in the recycled gas flowing through the recycled gas passage. The recycled gas first flows through the first heat exchanger 8 and then flows through the condenser 16. In a case where the condenser 16 removes the steam, for example, the condenser 16 cools down the recycled gas by the heat exchange to further condense the steam in the recycled gas. One example of the condenser 16 is a heat exchanger. However, the condenser 16 may have any configuration as long as it can cool down the recycled gas. The moisture removed by the condenser 16 is separated from the recycled gas passage 7 in the condenser 16 through a discharge water passage (not shown).

Thus, since the recycled gas is cooled down by the first heat exchanger 8, there is a possibility that the increase in passage resistance of the recycled gas passage 7 by the condensed water, the clogging of the recycled gas passage by the condensed water, or the like occurs. However, since the moisture in the recycled gas is removed by the condenser 16, this possibility can be reduced. Further, there is another possibility that the booster 15 (one example of the auxiliary device) and the like are damaged by the condensed water. However, this possibility can be reduced.

FIG. 7 showing the present embodiment shows that the fuel cell system 100 according to Embodiment 2 includes the condenser 16. However, the present embodiment is not limited to this. The fuel cell system 100 according to any one of Examples 1 and 2 of Embodiment 1 and Modification Examples 1 to 3 of Embodiment 1 may include a condenser similar to the condenser 16.

From the above invention, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

According to the aspect of the present invention, the fuel cell system can realize the higher efficiency than before by the heat recovery from the recycled gas and perform the more stable driving operation than before. Therefore, the aspect of the present invention can be utilized for the fuel cell system, for example.

REFERENCE SIGNS LIST 3 desulfurizer
4 reformer
6 fuel cell
7 recycled gas passage
8 first heat exchanger
9 second heat exchanger
10 third heat exchanger
11 fourth heat exchanger
12 combustor
13 exhaust gas passage
14 heater
15 booster
16 condenser
100 fuel cell system

The invention claimed is:

1. A fuel cell system comprising:
a reformer operative to generate a reformed gas by using a raw material gas;
a solid-oxide fuel cell operative to generate electric power by using the reformed gas from the reformer and air;
a desulfurizer operative to perform hydrodesulfurization of the raw material gas to be supplied to the reformer;
a recycled gas passage through which a part of the reformed gas is supplied as a recycled gas to a raw material gas passage provided upstream of the desulfurizer; and
a first heat exchanger operative to cause the recycled gas flowing through the recycled gas passage to perform heat exchange with the raw material gas before the recycled gas is mixed with the raw material gas,
wherein the raw material gas flows through the first heat exchanger and the desulfurizer in this order.

2. The fuel cell system according to claim 1, further comprising:
a combustor operative to combust the reformed gas and the air which are unused by electric power generation;

an exhaust gas passage through which an exhaust gas from the combustor flows; and a second heat exchanger operative to cause the exhaust gas flowing through the exhaust gas passage to perform the heat exchange with the raw material gas, wherein the raw material gas flows through the first heat exchanger, the second heat exchanger, and the desulfurizer in this order.

3. The fuel cell system according to claim 2, further comprising a heater operative to heat the desulfurizer by the exhaust gas flowing through the exhaust gas passage, wherein the exhaust gas flows through the heater and the second heat exchanger in this order.

4. The fuel cell system according to claim 1, further comprising a booster operative to boost pressure of the raw material gas to supply the raw material gas to the desulfurizer, wherein the recycled gas is supplied to the raw material gas passage provided upstream of the booster.

5. The fuel cell system according to claim 1, further comprising a condenser operative to remove moisture in the recycled gas flowing through the recycled gas passage, wherein the recycled gas first flows through the first heat exchanger and then flows through the condenser.

6. The fuel cell system according to claim 1, wherein the recycled gas passage branches from a gas passage between the reformer and the solid-oxide fuel cell.

7. A fuel cell system comprising:
a reformer operative to generate a reformed gas by using a raw material gas;
a solid-oxide fuel cell operative to generate electric power by using the reformed gas from the reformer and air;
a desulfurizer operative to perform hydrodesulfurization of the raw material gas to be supplied to the reformer;
a recycled gas passage through which a part of the reformed gas is supplied as a recycled gas to a raw material gas passage provided upstream of the desulfurizer; and
a first heat exchanger operative to cause the recycled gas flowing through the recycled gas passage to perform the heat exchange with the air,
wherein the air flows through the first heat exchanger and the solid-oxide fuel cell in this order.

8. The fuel cell system according to claim 7, further comprising:
a combustor operative to combust the reformed gas and the air which are unused by electric power generation;
an exhaust gas passage through which an exhaust gas from the combustor flows; and
a second heat exchanger operative to cause the exhaust gas flowing through the exhaust gas passage to perform the heat exchange with the air,
wherein the air flows through the first heat exchanger, the second heat exchanger, and the solid-oxide fuel cell in this order.

9. The fuel cell system according to claim 7, wherein the recycled gas passage branches from a gas passage between the reformer and the solid-oxide fuel cell.

* * * * *